(12) United States Patent
Lee

(10) Patent No.: US 10,145,941 B2
(45) Date of Patent: Dec. 4, 2018

(54) LIDAR SENSOR ATTACHED TO AN ACTUATOR

(71) Applicant: TOYOTA MOTOR ENGINEERING & MANUFACTURING NORTH AMERICA, INC., Erlanger, KY (US)

(72) Inventor: Jae Seung Lee, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 317 days.

(21) Appl. No.: 15/220,007

(22) Filed: Jul. 26, 2016

(65) Prior Publication Data

US 2018/0031679 A1    Feb. 1, 2018

(51) Int. Cl.
*G01C 3/08* (2006.01)
*G01S 7/481* (2006.01)
*G01S 17/06* (2006.01)
*G01S 17/93* (2006.01)

(52) U.S. Cl.
CPC ............ *G01S 7/4817* (2013.01); *G01S 17/06* (2013.01); *G01S 17/936* (2013.01)

(58) Field of Classification Search
CPC ....... G01S 7/4817; G01S 17/936; G01S 17/06
USPC ......................................... 356/4.01
See application file for complete search history.

(56) References Cited

U.S. PATENT DOCUMENTS

| | | | |
|---|---|---|---|
| 6,248,989 B1 | 6/2001 | Ohishi | |
| 7,521,384 B2 | 4/2009 | Kanazawa et al. | |
| 7,818,891 B2 | 10/2010 | Roemhild et al. | |
| 2016/0178749 A1* | 6/2016 | Lin | G01S 17/08 348/302 |
| 2016/0282468 A1* | 9/2016 | Gruver | G01S 17/93 |
| 2018/0120422 A1* | 5/2018 | Fujita | G01S 7/4817 |

* cited by examiner

*Primary Examiner* — Mark Hellner
(74) *Attorney, Agent, or Firm* — Oblon, McClelland, Maier & Neustadt, L.L.P.

(57) ABSTRACT

An apparatus and a method for steering a chip scale LIDAR. A light detection and ranging apparatus includes an actuator with at least one pocket and at least one channel connected to the at least one pocket formed inside a material below a top surface of the actuator, a chip scale LIDAR attached on the top surface of the soft actuator, at least one pump connected to the at least one channel, and an actuation controller configured to control the at least one pump and to activate at least one mode of the actuator.

13 Claims, 11 Drawing Sheets

LIDAR SENSOR ATTACHED TO AN ACTUATOR

BACKGROUND

Field of the Disclosure

This application relates generally to improvements a light detection and ranging (LIDAR) sensor system. More particularly, a chip scale LIDAR attached to an actuator providing steering capability to the chip scale LIDAR to widen scanning range of the LIDAR sensor system.

Description of the Related Art

Light detection and ranging (LIDAR) sensor is a surveying technology that measures distance by illuminating a target with a laser light and calculating the time for the light signal to return. A conventional LIDAR sensor includes a mechanical scanning configuration for wide field-of-view that uses rotating mirrors driven by a motor. Such configuration results in a bulky, slow and expensive LIDAR sensor. Further, a rotation system with motors gets complex since it requires high precision and long term reliability in automotive environment. Furthermore, such mechanically steered LIDAR sensors do not possess a form factor that fits well within a modern automobile. Further, the conventional LIDAR sensors are slow and have a limited scan speed ranging from 10 Hz to 20 Hz. As such, use of conventional LIDAR sensor in automotive application such as accident avoidance can be limited.

Today's highly automated automotive require a continuous beam steering to implement advanced features such object detection and accident avoidance. There remains continued need to improve the cost, size and reliability of the LIDAR sensor in automotive applications or other relevant robotic application.

SUMMARY

According to an embodiment of the present disclosure, there is provided a light detection and ranging apparatus. The light detection and ranging (LIDAR) includes an actuator with at least one pocket and at least one channel connected to the at least one pocket formed inside a soft material below a top surface of the actuator, a chip scale LIDAR attached on the top surface of the actuator, and at least one pump connected to the at least one channel. Further, an actuation controller configured to control the at least one pump and to activate at least one mode of the actuator.

Further, according to an embodiment of the present disclosure, there is provided a method for steering a chip scale LIDAR attached to an actuator. The method includes activating, using processing circuitry, a first mode of the actuator to steer the chip scale LIDAR in a first position, activating, using the processing circuitry, one or more pumps corresponding to the first mode of the actuator, activating, using the processing circuitry, a next mode of the actuator to steer the chip scale LIDAR to a next position, activating, using the processing circuitry, one or more pumps corresponding to the next mode of the actuator, and determining, using the processing circuitry, whether steering of the chip scale LIDAR should be stopped.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," and the like that may be used herein merely describe points of reference with respect to a figure, when the figure is held such that a figure caption is below the figure and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," and similar terms generally refer to ranges that include the identified value within a margin of 20%, 10% or preferably 5% in certain embodiments, and any values therebetween.

Figure 1:
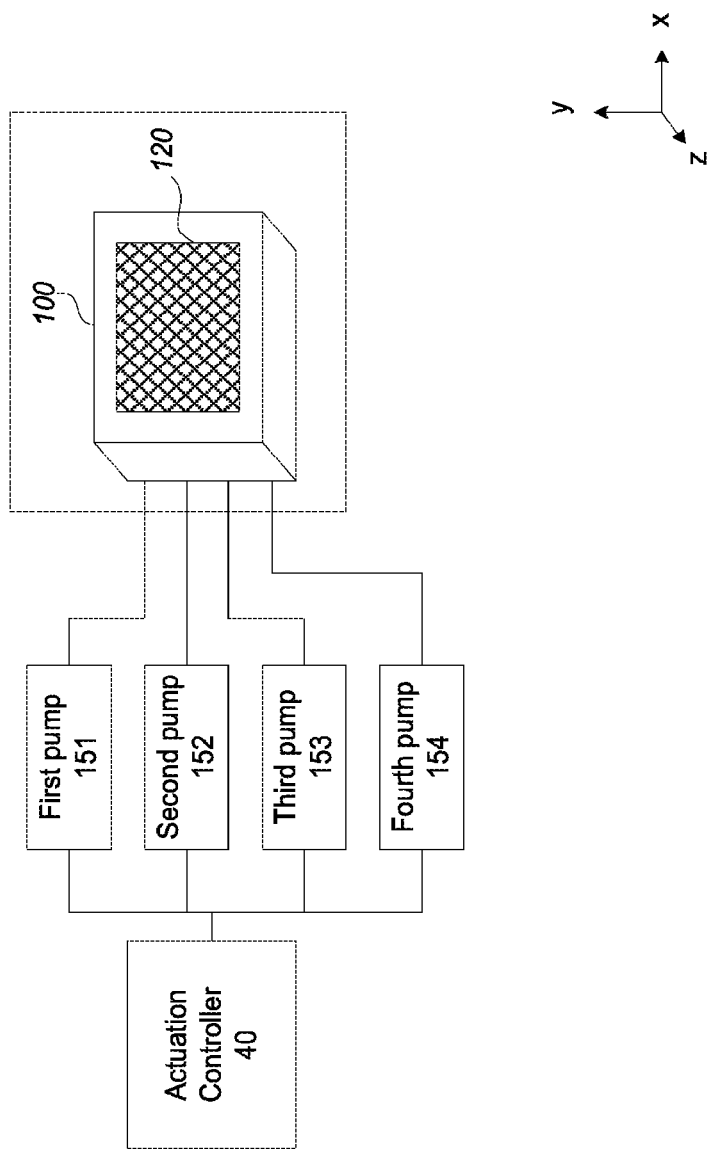
FIG. 1 illustrates an actuator attached to a chip scale LIDAR (cLIDAR) sensor according to an exemplary embodiment of the present disclosure.

FIG. 1 illustrates an actuator attached to a chip scale LIDAR sensor according to an exemplary embodiment of the present disclosure. A chip scale LIDAR 120 (cLIDAR 120 hereinafter) is a high-speed, and low-power optical phased array. The optical phased array can be based on a phase shifting architecture. The approach utilizes an approximately 32 μm long grating based antennas, fed through evanescent field waveguide couplers from a bus waveguide with directly integrated thermo-optic phase shifters. Several such cLIDARs can work together without interfering, an important feature for accident avoidance applications. The cLIDAR 120 can be fabricated in a CMOS compatible process that allows continuous, fast (more than 100 kHz), wide-angle (up to 51°) beam steering when the cLIDAR 120 is in stationary state. The cLIDAR 120 can be attached to an actuator 100 that enables steering of the cLIDAR 120 and increased scanning range to more than 50°. The cLIDAR 120 can be attached to a actuator 100 in a fixed manner using an adhesive.

The actuator 100 is made of a soft material such as a silicone rubber substrate allowing for flexing and bending. Further, the silicone rubber substrate can include metal embedded or disposed thereon. The soft materials can be fabricated from compliant materials such as polymers, elastomers, hydrogels, granules, etc. The soft material can be powered using different actuation technologies such as pneumatic, electrical, and chemical. The actuation speed can be fast (greater than 1 Hz) or slow (less than 0.1 Hz). According to an embodiment of the present disclosure, fast actuation may be desired.

The actuator 100 can be light weight, inexpensive, easily fabricated (e.g., using 3D printing technology, molding, or vacuum forming), and able to provide linear or non-linear motion with simple inputs. For instance, the actuator 100 can receive input from pumps 151-154, which are controlled by an actuation controller 40.

The actuator 100 is an actuator made of the material and powered pneumatically to enable steering of an attached component such as the cLIDAR 120. The actuator 100 can include an air pump such as a piezoelectric diaphragm embedded inside the soft material. Alternatively or in addition, an external pump can be used to cause the actuation of the soft material actuator. According to one embodiment of the present disclosure, the actuator 100 is connected to a plurality of pneumatic pumps such as a first pump 151, a second pump 152, a third pump 153, and a fourth pump 154. The pumps 151-154 can be a piezoelectric pump, or any other small pump that can be controlled using the actuation controller 40.

The actuation controller 40 is configured to control the steering of the cLIDAR 120 by activating or deactivating one or more of the first pump 151, the second pump 152, the third pump 153, and the fourth pump 154. When a pneumatic pump (i.e., one of the pumps 151-154) is activated, the pneumatic pump discharges air into the actuator 100 causing a part of the actuator 100 to inflate (or expand). The inflation of a part of the actuator 100 creates a bump on the top surface, of the actuator 100 where the cLIDAR 120 is attached. As such, a part of the cLIDAR 120 will be in a relatively raised position. When the pneumatic pump (i.e., one of the pumps 151-154) is deactivated, the pneumatic pump draws air out of the actuator 100 causing the inflated part (or the bump) of the actuator 100 to deflate and become flat. The steering of the cLIDAR 120 is discussed in detail with respect to FIGS. 3A, 3B, 4A, 4B, 5A, 5B, 6A, 6B, 7A and 7B, and a control logic of the actuation controller 40 is illustrated in FIG. 8.

A pressure sensor and a position sensor can be disposed internally or externally to the actuator 100. The pressure sensor can measure a pressure inside the actuator 100 and the position sensor can measure a position angle of inclination, or a height) of the cLIDAR 100 with respect to the top surface of the actuator 100. The pressure sensor and position sensor can send signals to the actuation controller 40 for further processing and controlling the steering of the cLIDAR 120.

A controller (for example, controller 405 or a CPU 400 of the actuation controller 40) or processing circuitry such as the actuation controller 40 includes a programmed processor. The processing circuitry or controller may also include devices such as an application specific integrated circuit (ASIC) and conventional circuit components arranged to perform the recited functions. Each of the functions of the described embodiments (with reference to FIGS. 3A, 3B, 4A, 4B, 5A, 5B, 6A, 6B, 7A, 7B, 8 and 9.) can be implemented by one or more processing circuits or controllers.

The cLIDAR 120 attached to the actuator 100 can have several applications including but not limited to automobiles, gesture sensor technology, automated vacuum cleaner technology, assembly lines, and other robotic application that may require depth or range sensing.

Figure 2B:
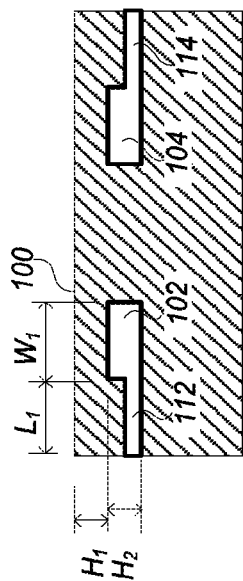
FIG. 2B a cross-section of the actuator according to an exemplary embodiment of the present disclosure.
Figure 2A:
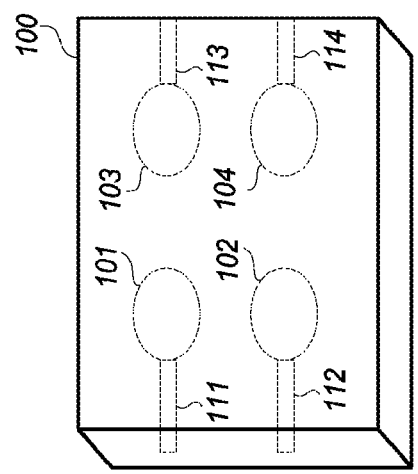
FIG. 2A illustrates the actuator according to an exemplary embodiment of the present disclosure.

FIG. 2A illustrates the actuator 100 according to an exemplary embodiment of the present disclosure. The actuator 100 includes a plurality of pockets such as a first pocket 101, a second pocket 102, a third pocket 103, and a fourth pocket 104. Each of the plurality of pockets is an empty cavity inside the soft material of the actuator 100 (refer FIG. 2B). The empty cavity can be of any shape such as hemispherical, rectangular, square, triangular, etc. Walls of the empty cavity can be reinforced to allow inflation (or expansion) of the empty cavity in a particular direction. Furthermore, the plurality of pockets can be separate and independent from each other to prevent expansion of one pocket to cause expansion of a neighboring pocket. For example, the first pocket 101 can be placed in a first quadrant, the second pocket 102 can be placed in a second quadrant, the third pocket 103 can be placed in a third quadrant, and the fourth pocket 104 can be placed in a fourth quadrant. Accordingly, expansion of the first pocket 101 will not cause expansion of the neighboring pockets such as the second pocket 102 and the third pocket 103. The distance between the plurality of the pockets can be determined based on the expansion characteristics of the soft material used to fabricate the actuator 100 and the size of the cLIDAR 120 attached to the actuator 100. The reinforcement of the empty cavity can affect the expansion and contraction characteristics of the actuator 100. In one embodiment of the present disclosure, more than one pocket can be formed in a quadrant.

Each of the plurality of pockets is connected to a channel. The channel provides an enclosed passage for a fluid to enter a connected pocket. For example, a first channel 111 is connected to the first pocket 101, a second channel 112 is connected to the second pocket 102, a third channel 113 is connected to the third pocket 103, and a fourth channel 114 is connected to the fourth pocket 104. The plurality of pockets can be filled with a fluid such as air via the channel.

Each channel can be connected to an independent pump which pumps fluid in and out of the channel and the pocket connected to the channel. For example, the first pump 151 connected to the first channel 111 can pump fluid in and out of the first pocket 101. Similarly, the second pump 152, the third pump 153, and the fourth pump 154 connected to the second channel 112, the third channel 113, and the fourth channel 114, respectively, can pump fluid in and out of the second pocket 102, the third pocket 103, and the fourth pocket 104, respectively.

In one embodiment, one channel can be connected to two pockets and can receive input from one pump to activate a mode of the actuator 100. For example, the first channel 111 can be connected to the first pocket 101 and the second pocket 102, and the first channel can receive input from the first pump 151. When the first pump 151 is activated, air is discharged to the first pocket 101 and the second pocket 102 simultaneously, thus activating a first mode of the actuator 100. Similarly, the second channel 111 can be connected to the first pocket 101 and the third pocket 103 and receive input from the second pump 152 to activate a different mode of the actuator 100.

The flow rate and the pressure of the fluid can be controlled by the actuator controller 120. As such, the inflation or deflation of the first pocket 101, the second pocket 102, the third pocket 103, and the fourth pocket 104 can be controlled.

A single pump can be used to supply fluid to the actuator 100. For example, a single pump can be connected to four pipes fitted with a valve that can be controlled independently by the actuation controller 40. The four pipes can be connected to each channel, respectively. As such, depending upon which valve is opened and closed, different modes of the actuator 100 can be activated and deactivated.

Further, a plurality of separate actuators, each having a single pocket can be used to steer a cLIDAR 120. For example, four actuators can be arranged in an array (e.g., each actuator being a quadrant) and four corners of the cLIDAR 120 can be attached to each of the four actuators, respectively. One or more of the actuators can be inflated or deflated to activate different modes of operation of the actuator resulting in steering of the cLIDAR 120.

FIG. 2B is a cross-section of the actuator 100 according to an exemplary embodiment of the present disclosure. Inside the actuator 100, the second pocket 102 and the fourth pocket 104 are formed. The second pocket 102 can be formed at a distance $H_1$ from the top surface of the actuator 100 and can be $H_2$ deep and $W_1$ wide. The channel 112 connected to the second pocket 102 can be of length $L_1$. The fourth pocket 104 and the fourth channel 114 can have approximately similar dimensions. The dimension of the pockets 101-104 can be based on the expansion and contraction (or inflation and deflation) characteristics of the soft material used to fabricate the actuator 100, as discussed earlier. Furthermore, the dimension can be based on the size (e.g., length and width) of the cLIDAR 120, a field-of-view (referred as FOV hereinafter) of the cLIDAR 120, and a desired field-of-view required to perform a desired function such as accident avoidance and object detection in case of automotive applications.

Figure 3A:
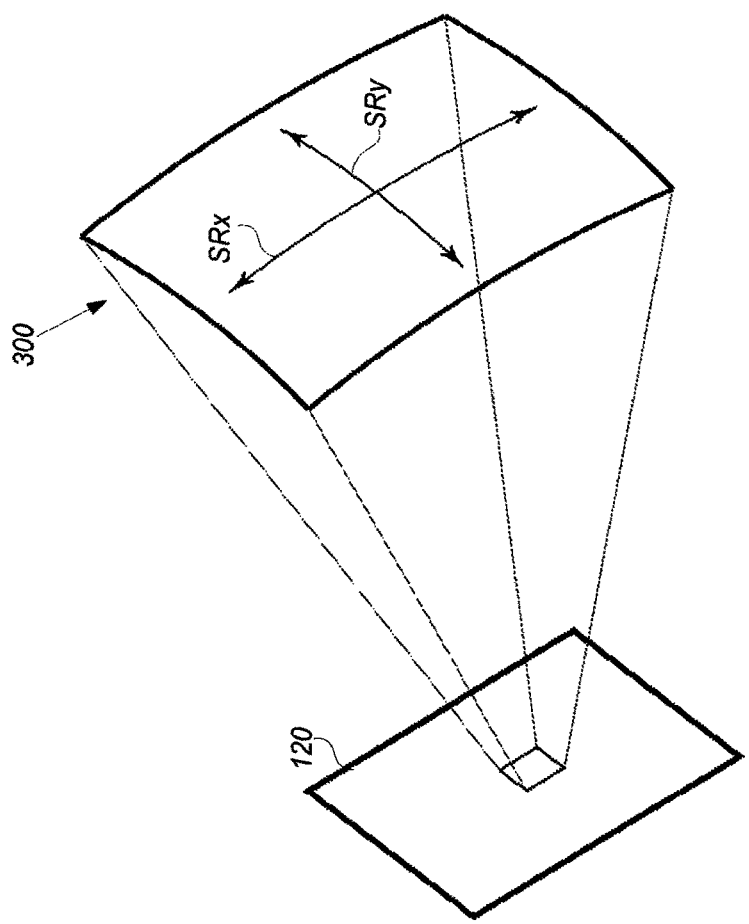
FIG. 3A illustrates a field-of-view of the cLIDAR according to an exemplary embodiment of the present disclosure.

FIG. 3A illustrates an exemplary field-of-view of the cLIDAR 120 according to an exemplary embodiment of the present disclosure. When the cLIDAR 120 is in a stationary state or not connected to the actuator 100, the cLIDAR 120 has a field-of-view 300. The field-of-view 300 of the cLIDAR 120 can be defined as an envelope of an observable world that can be detected by the cLIDAR 120. The envelope can be conical or prismatic shaped. The FOV 300 has a scanning direction SD, and a scanning range SRx and SRy. As such the cLIDAR 120 has a two dimensional scanning capability. The FOV 300 is measured in a direction perpendicular to the plane of the cLIDAR 120.

Figure 3B:
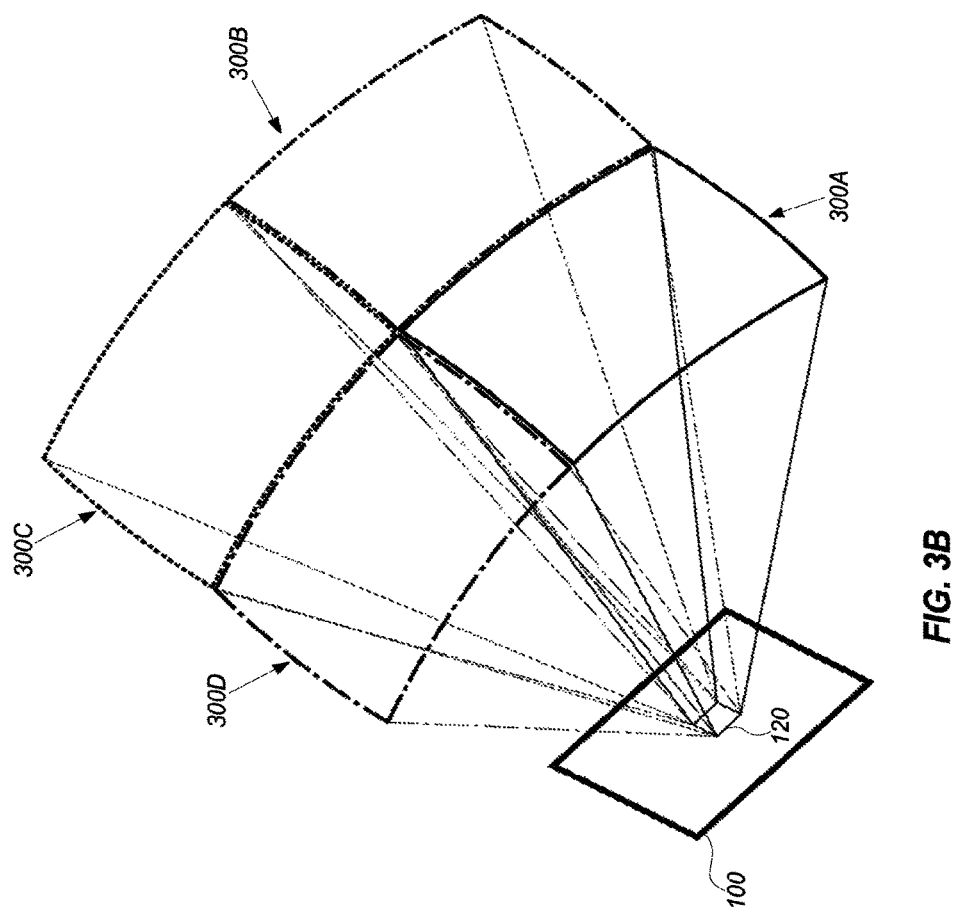
FIG. 3B illustrates a field-of-view in operation of the cLIDAR according to an exemplary embodiment of the present disclosure.

FIG. 3B illustrates a desired field-of-view of the cLIDAR 120 attached to the actuator 100 according to an exemplary embodiment of the present disclosure. In operation, the actuator 100 steers the cLIDAR 120 in a certain direction increasing the field-of-view of the cLIDAR 120. A desired field-of-view can be defined as an aggregation of the field-of-views of the cLIDAR 120 obtained from activation of different steering modes of the actuator 100. For example, a desired field-of-view can be an aggregation of a first FOV 300A obtained during operation in a first mode M1, a second FOV 300B obtained during operation in a second mode M2, a third FOV 300C obtained during operation in a third mode M3, and a fourth FOV 300D obtained during operation in a fourth mode M4. According to one embodiment of the present disclosure, one FOV (e.g., the first FOV 300A) may intersect with another FOV (e.g., the second FOV 300B) indicating the intersecting portion of two FOVs can be scanned in either the first mode M1 or the second mode M2. Furthermore, in case of an array of cLIDARs 120 arranged adjacent to each other, interference may be created; however, such interference does not diminish the capability of detecting an object located in the interfering portion.

Figure 4B:
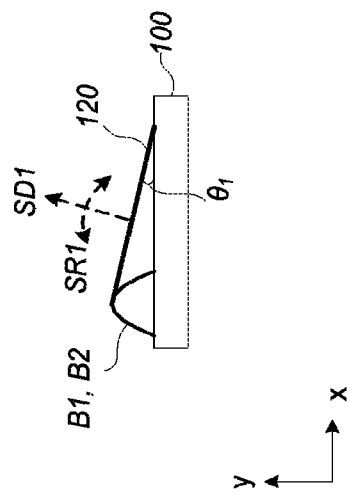
FIG. 4B illustrates a first position of the cLIDAR according to an exemplary embodiment of the present disclosure.
Figure 4A:
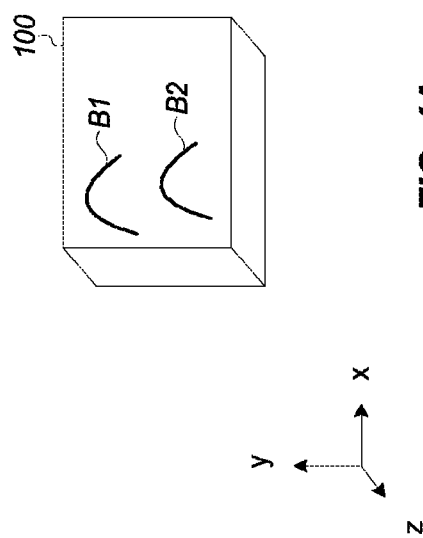
FIG. 4A illustrates a first mode of operation of the actuator according to an exemplary embodiment of the present disclosure.

FIG. 4A illustrates the first mode M1 of operation of the actuator 100 according to an exemplary embodiment of the present disclosure. In the first mode M1, the first pocket 101 and the second pocket 102 are inflated by the first pump 151 and the second pump 152, respectively. The inflation of the first pocket 101 creates a first bump B1, and the inflation of the second pocket 102 creates a second bump B2.

FIG. 4B illustrates a first position of the cLIDAR 120 according to an exemplary embodiment of the present disclosure. The first position of the cLIDAR 120 occurs when the first mode M1 of the actuator 100 is activated. In the first position, the cLIDAR 120 is inclined at a first angle $\theta_1$ due to the first bump B1 and the second bump B2, has a first scanning direction SD1, and a first scanning range SR1.

Figure 5B:
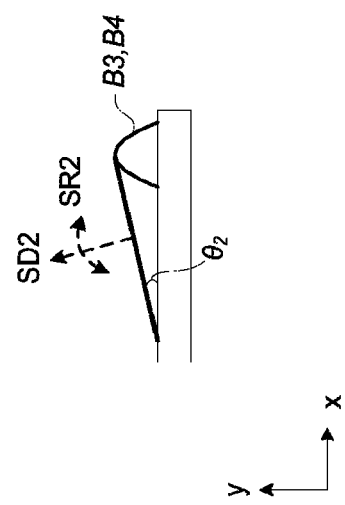
FIG. 5B illustrates a second position of the cLIDAR according to an exemplary embodiment of the present disclosure.
Figure 5A:
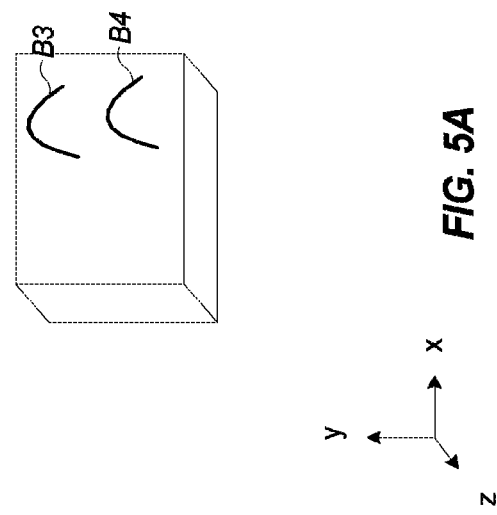
FIG. 5A illustrates a second mode of operation of the actuator according to an exemplary embodiment of the present disclosure.

FIG. 5A illustrates the second mode M2 of operation of the actuator 100 according to an exemplary embodiment of the present disclosure. In the second mode M2, the third pocket 103 and the fourth pocket 104 are inflated by the third pump 153 and the fourth pump 154, respectively. The inflation of the third pocket 103 creates a third bump B3, and the inflation of the fourth pocket 104 creates a fourth bump B4.

FIG. 5B illustrates a second position of the cLIDAR 120 according to an exemplary embodiment of the present disclosure. The second position of the cLIDAR 120 occurs when the second mode M2 of the actuator 100 is activated. In the second position, the cLIDAR 120 is inclined at a second angle $\theta_2$ due to the third bump B3 and the fourth bump B4, has a second scanning direction SD2, and a second scanning range SR2.

Figure 6B:
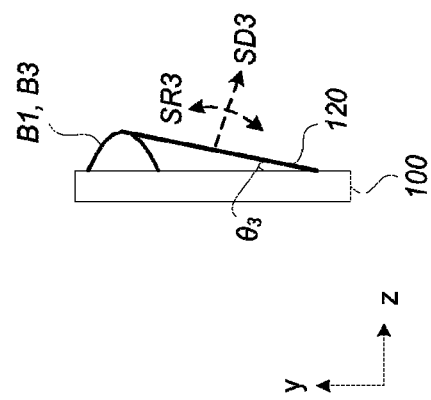
FIG. 6B illustrates a third position of the cLIDAR according to an exemplary embodiment of the present disclosure.
Figure 6A:
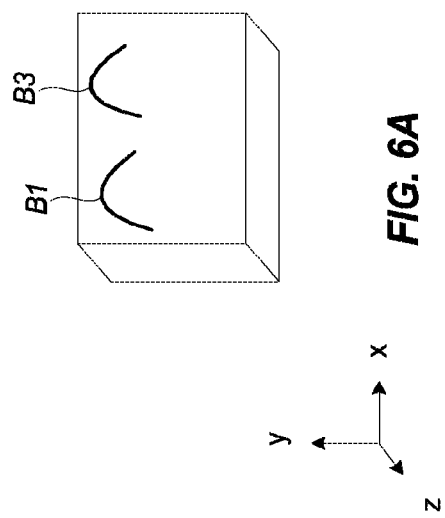
FIG. 6A illustrates a third mode of operation of the actuator according to an exemplary embodiment of the present disclosure.

FIG. 6A illustrates the third mode M3 of operation of the actuator 100 according to an exemplary embodiment of the present disclosure. In the third mode M3, the first pocket 101 and the third pocket 103 are inflated by the first pump 151 and the third pump 153, respectively. The inflation of the first pocket 101 creates a first bump B1, and the inflation of the third pocket 103 creates a third bump B3.

FIG. 6B illustrates a third position of the cLIDAR 120 according to an exemplary embodiment of the present disclosure. The third position of the cLIDAR 120 occurs when the third mode M3 of the actuator 100 is activated. In the third position, the cLIDAR 120 is inclined at a third angle $\theta_3$ due to the first bump B1 and the third bump B3, has a third scanning direction SD3, and a third scanning range SR3.

Figure 7A:
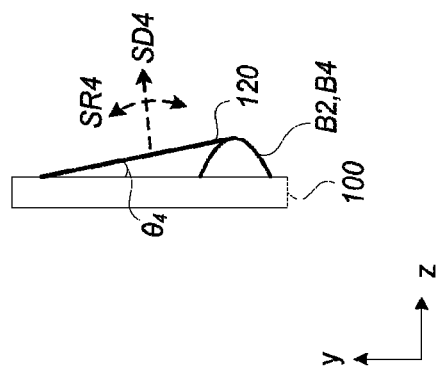
FIG. 7A illustrates a fourth mode of operation of the actuator according to an exemplary embodiment of the present disclosure.
Figure 7A:
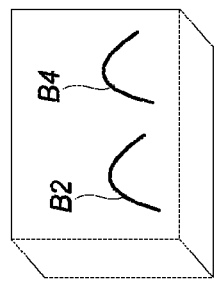
Figure 8:
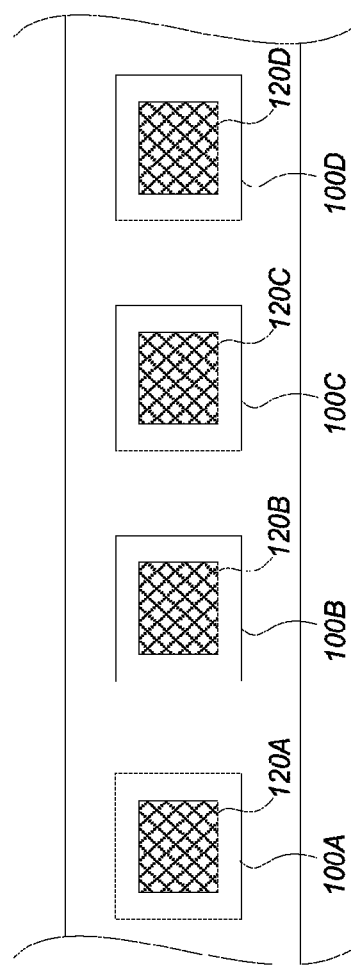
FIG. 8 illustrates an array of cLIDAR installed on the actuator according to an exemplary embodiment of the present disclosure.

FIG. 7A illustrates a fourth mode of operation of the actuator 100 according to an exemplary embodiment of the present disclosure. In the fourth mode M4, the second pocket 102 and the fourth pocket 104 are inflated by the second pump 152 and the fourth pump 154, respectively. The inflation of the second pocket 102 creates the second bump B2, and the inflation of the fourth pocket 104 creates the fourth bump B4.

Figure 7B:
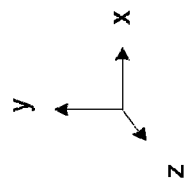
FIG. 7B illustrates a fourth position of the cLIDAR according to an exemplary embodiment of the present disclosure.

FIG. 7B illustrates a fourth position of the cLIDAR 120 according to an exemplary embodiment of the present disclosure. The fourth position of the cLIDAR 120 occurs when the fourth mode M4 of the actuator 100 is activated. In the fourth position, the cLIDAR 120 is inclined at a fourth angle $\theta_4$ due to the second bump B2 and the fourth bump B4, has a fourth scanning direction SD4, and a fourth scanning range SR4.

FIG. 8 illustrates an array of cLIDAR installed on the actuator 100 according to an exemplary embodiment of the present disclosure. An array of cLIDAR 120A-120D can be attached to a single actuator 100, which is configured to steer multiple cLIDAR. Such an array of cLIDAR can significantly widen the scanning range without loss of speed or accuracy. In one embodiment of the present disclosure, the cLIDAR 120A-120D can be attached to different actuators 100A-100D, respectively. Each actuator 100A-100D can be controlled independently by the actuation controller 40.

Figure 9:
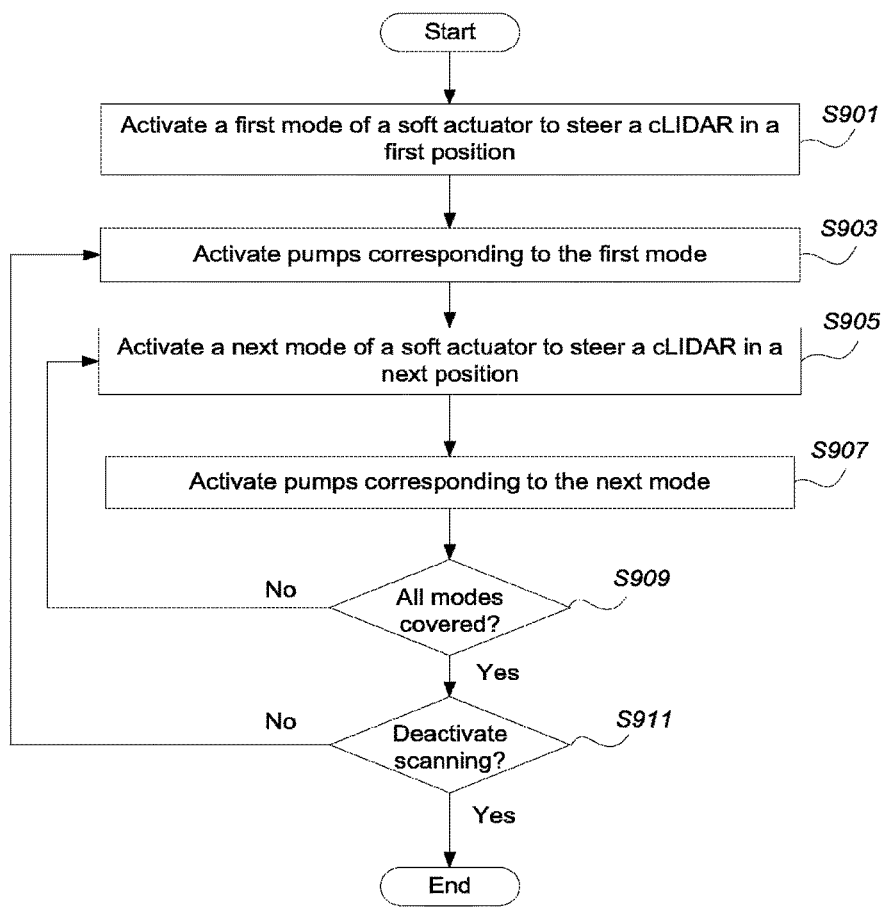
FIG. 9 is an exemplary flow chart of control logic executed on an actuation controller according to an exemplary embodiment of the present disclosure.

FIG. 9 flow chart for actuation control process of the actuator 100 according to an exemplary embodiment of the present disclosure. The actuation control process starts when a scanning request is activated, for example, by switching on a cLIDAR or the actuation controller 40.

In step S901, the first mode M1 of the actuator 100 is activated to steer the cLIDAR 120 to a first position. The first mode M1 of the actuator 100 corresponds to the first position of the cLIDAR 120, where the cLIDAR 120 captures object information within the first FOV 300A. The first mode M1 can be activated by activating pumps corresponding to the first mode M1, in step S903. For example, the first pump 101 and the second pump 102 can be activated resulting in the first position of the cLIDAR 120, as discussed with respect to FIGS. 3A and 3B.

In step S905, a next mode of the actuator 100 is activated to steer the cLIDAR 120 to a next position. As the actuator 100 can operate in a plurality of modes, the next mode can be the second mode M2, the third mode M3, or the fourth mode M4. Accordingly, the cLIDAR 120 can occupy the second position, the third position, or the fourth position.

The next mode (e.g., the second mode M2) can be activated by activating pumps corresponding to the next mode (e.g., the second mode M2), in step S907. For example, the third pump 103 and the fourth pump 104 can be activated resulting in the second position of the cLIDAR 120, as discussed with respect to FIGS. 4A and 4B. Similarly, the next mode can be the third mode M3, in which case the first pump 101 and the third pump 103 can be activated. The next mode can be the fourth mode M4, in which case the second pump 102 and the fourth pump 104 can be activated.

Although the actuator 100 can be operated in different modes, only one mode is active at any point in time. When one mode is activated, the other modes are deactivated.

In step S909, a determination is made if all the modes of the actuator 100 are activated at least once. If not, the process iteratively performs the steps S905 and S907 until all the modes are covered. When all the modes of the actuator 100 are activated at least once a determination is made if the scanning needs to be deactivated or continued, in step S911. The determination can be based on a signal from an external device such as a button to switch on or off a scanning process, an electronic control unit of a highly automated vehicle, etc. If the scanning process is continued, the steps S903-S909 are performed iteratively. If the scanning process is deactivated, the process ends.

Figure 10:
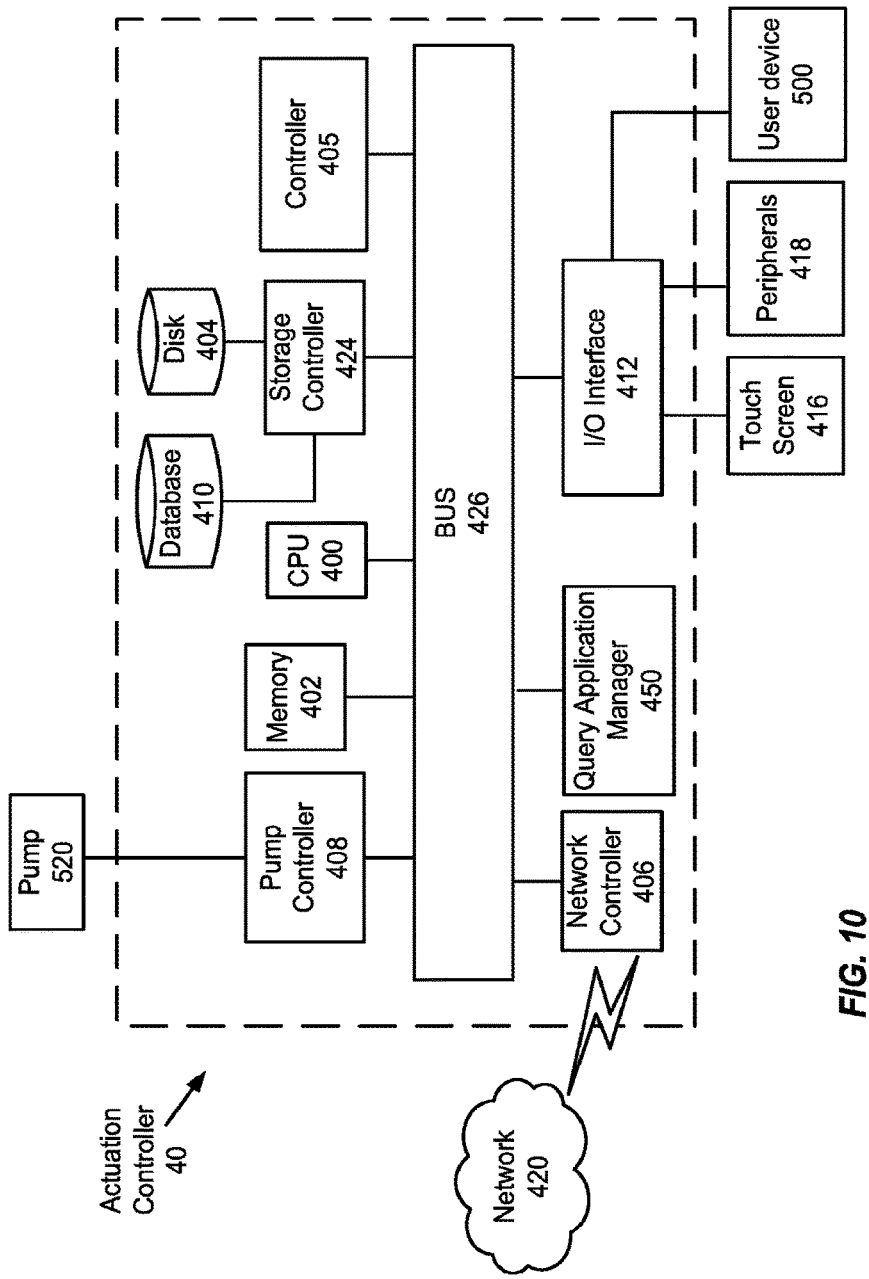
FIG. 10 is a detailed block diagram illustrating an exemplary actuation controller according to certain embodiments of the present disclosure.

FIG. 10 is a detailed block diagram illustrating an exemplary actuation controller 40 according to certain embodiments of the present disclosure. In FIG. 10, the actuation controller 40 includes a CPU 400 which can be configured to perform the processes described in the present disclosure with respect to FIGS. 4A, 4B, 5A, 5B, 6A, 6B, 7A, 7B, and 8. The process data and instructions may be stored in a memory 402. These processes, instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the actuation controller 40 communicates, such as a server or computer.

Further, the claimed advancements may be provided as a utility application, background daemon, or component of an operating system, or combination thereof, executing in conjunction with CPU 400 and an operating system such as Microsoft Windows 10, UNIX, Solaris, LINUX, Apple MAC-OS and other systems known to those skilled in the art.

The hardware elements, in order to achieve the actuation controller 40, may be realized by various circuitry elements, known to those skilled in the art. For example, CPU 400 may be a XENON or Core processor from INTEL of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above with respect to FIGS. 4A, 4B, 5A, 5B, 6A, 6B, 7A, 7B, and 8.

The actuation controller 40, in FIG. 10, also includes a network controller 406, such as an INTEL Ethernet PRO network interface card from Intel Corporation of America, for interfacing with a network 420. As can be appreciated, the network 420 can be a public network, such as the Internet, or a private network such as an LAN or WAN network, or any combination thereof and can also include PSTN or ISDN sub-networks. The network 420 can also be wired, such as an Ethernet network, or can be wireless such as a cellular network including EDGE, 3G and 4G wireless cellular systems. The wireless network can also be WiFi, BLUETOOTH, or any other wireless form of communication that is known. The actuation controller 40 can communicate with external devices such as the user device 500 via the network controller 406.

The actuation controller 40 can further include a pump controller 408. The pump controller 408 can control a pump 520 directly or via the network 420. The pump 520 is an exemplary representation of the first pump 151, the second pump 152, the third pump 153, and the fourth pump 154.

The actuation controller 40 can be connected to a user device 500 such as a smartphone, laptop, touchpad, etc. via an I/O interface 412 or through the network 420. The user device 500 can send queries that are handled by a query application manager 450 including extracting data from the disk 404 or a database 410 via the storage controller 424, from the memory 402, or trigger execution of processes discussed in FIGS. 4A, 4B, 5A, 5B, 6A, 6B, 7A, 7B, and 8.

The controller 405 can be used to implement optimization algorithms and may include one or more CPUs, and may control each element in the user device 500 to perform functions related to communication control, audio signal processing, control for the audio signal processing, still and moving image processing and control, and other kinds of signal processing. The controller 405 may perform these functions by executing instructions stored in a memory 402, for example, the processes illustrated in FIG. 2.

The storage controller 424 connects the storage medium disk 404 or the database 410 with communication bus 426, which may be an ISA, EISA, VESA, PCI, or similar device, for interconnecting all of the components of the actuation controller 40. A description of the general features and functionality of the keyboard and/or mouse 414, as well as the storage controller 424, network controller 406, and the I/O interface 412 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A light detection and ranging apparatus, comprising:
an actuator including at least one pocket and at least one channel connected to the at least one pocket formed inside a soft material below a top surface of the actuator;
a chip scale lidar attached on the top surface of the actuator;
at least one pump connected to the at least one channel of the actuator; and
an actuation controller configured to control the at least one pump and to activate or deactivate at least one mode of the actuator.

2. The apparatus according to claim 1, wherein a first pocket of the at least one pocket is separate and independent from a second pocket of the at least one pocket.

3. The apparatus according to claim 1, wherein the at least one channel receives input from only one pump of the at least one pump.

4. The apparatus according to claim 3, wherein the at least one pump is a pneumatic pump that discharges air to the at least one channel connected to the at least one pump.

5. The apparatus according to claim 4, wherein the air discharged from the at least one pump is directed by the at least one channel to the at least one pocket causing a bump to be formed on the top surface of the actuator.

6. The apparatus according to claim 1, wherein the actuation controller is configured to simultaneously activate or deactivate one or more pumps of the at least one pump.

7. The apparatus according to claim 6, wherein the actuation controller is configured to activate one or more pumps of the at least one pump to activate a first mode of the at least one mode of the actuator.

8. The apparatus according to claim 7, wherein the first mode of the at least one mode of the actuator steers the chip scale lidar into a first position.

9. The apparatus according to claim 8, wherein the first position of the chip scale lidar corresponds to a first angle with respect to the top surface of the actuator, a first scanning direction, and a first scanning range of the chip scale lidar.

10. The apparatus according to claim 1, wherein the chip scale lidar is attached to the top surface of the actuator with a corner of the chip scale lidar attached directly above the at least one pocket.

11. A method for steering a chip scale lidar attached to an actuator, the method comprising:
- activating, using processing circuitry, a first mode of the actuator to steer the chip scale lidar to a first position;
- activating, using the processing circuitry, one or more pumps corresponding to the first mode of the actuator;
- activating, using the processing circuitry, a next mode of the actuator to steer the chip scale lidar to a next position;
- activating, using the processing circuitry, one or more pumps corresponding to the next mode of the actuator; and
- determining, using the processing circuitry, whether steering of the chip scale lidar can be stopped.

12. The method according claim 11, wherein activating the first mode of the actuator creates a first set of bumps on the top surface of the actuator.

13. The method according claim 11, wherein activating the next mode of the actuator deactivates a previously active mode of the actuator.

* * * * *